United States Patent
Ronning et al.

(10) Patent No.: US 12,027,944 B2
(45) Date of Patent: *Jul. 2, 2024

(54) ELECTRIC DRIVE UNIT WITH A HEAT EXCHANGER THAT IS FORMED BY DISKS HAVING A DISK SPRING PORTION AND WHICH ARE RECEIVED INTO A BORE IN A ROTOR SHAFT OF AN ELECTRIC MOTOR

(71) Applicant: AMERICAN AXLE & MANUFACTURING, INC., Detroit, MI (US)

(72) Inventors: Jeffrey J. Ronning, Grosse Pointe Farms, MI (US); Paul J. Valente, Berkley, MI (US); Christopher D. Pump, Macomb, MI (US); Frederick E. Zink, Capac, MI (US); Bangalore Lingaraj Yashwanth, Troy, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,217

(22) Filed: Jul. 24, 2023

(65) Prior Publication Data
US 2023/0369934 A1 Nov. 16, 2023

Related U.S. Application Data

(63) Continuation of application No. 17/795,497, filed as application No. PCT/US2022/016251 on Feb. 14, 2022, now Pat. No. 11,750,060.
(Continued)

(51) Int. Cl.
*H02K 5/20* (2006.01)
*H02K 1/32* (2006.01)
(Continued)

(52) U.S. Cl.
CPC ............. *H02K 5/203* (2021.01); *H02K 1/32* (2013.01); *H02K 7/116* (2013.01); *H02K 9/19* (2013.01)

(58) Field of Classification Search
CPC .................................. H02K 1/32; H02K 9/19
See application file for complete search history.

(56) References Cited

U.S. PATENT DOCUMENTS

| 3,659,125 A | 4/1972 | Basel |
| 4,600,848 A | 7/1986 | Sutrina et al. |
| (Continued) | | |

FOREIGN PATENT DOCUMENTS

| DE | 3408563 A1 | 3/1984 |
| EP | 2658089 A2 | 10/2013 |
| (Continued) | | |

OTHER PUBLICATIONS

PCT International Search Report dated Jun. 9, 2022 for corresponding PCT application No. PCT/US2022/016251, filed Feb. 14, 2022.

*Primary Examiner* — Daniel C Puentes
*Assistant Examiner* — Minki Chang
(74) *Attorney, Agent, or Firm* — Reising Ethington P.C.

(57) ABSTRACT

An electric drive unit that includes an electric motor having a rotor with a rotor shaft and a heat exchanger that is received in the rotor shaft. The heat exchanger has a plurality of heat exchanger plates, each of which having a hub, a rim member, and disc spring portion that interconnects the hub and the rib member. Each disk spring portion defines a plurality of coolant apertures. The heat exchanger plates are press-fit to the rotor shaft such that each disc spring portion is deflected from a pre-installation state, and each rim member is engaged to an interior surface of the rotor shaft while being spaced apart from adjacent rim members along a rotational axis of the rotor. A first coolant passage is disposed through the hubs of the plates. The coolant aper-
(Continued)

tures in the heat exchanger plates cooperate to form a plurality of second coolant passages.

16 Claims, 10 Drawing Sheets

Related U.S. Application Data (60) Provisional application No. 63/271,937, filed on Oct. 26, 2021, provisional application No. 63/159,511, filed on Mar. 11, 2021.

(51) Int. Cl.
*H02K 7/116* (2006.01)
*H02K 9/19* (2006.01)

(56) References Cited

U.S. PATENT DOCUMENTS

| | | | |
|---|---|---|---|
| 5,160,864 A | 11/1992 | Saito | |
| 5,418,412 A | 5/1995 | Brucker | |
| 5,509,381 A | 4/1996 | Fisher | |
| 6,707,180 B2* | 3/2004 | Hattori | H02K 1/32 |
| | | | 310/59 |
| 6,727,609 B2 | 4/2004 | Johnsen | |
| 6,897,581 B2 | 5/2005 | Doherty et al. | |
| 7,462,963 B2 | 12/2008 | Ishihara et al. | |
| 9,306,433 B2 | 4/2016 | Sten et al. | |
| 9,331,552 B2 | 5/2016 | Fedoseyev et al. | |
| 10,128,705 B2 | 11/2018 | Yang et al. | |
| 10,396,629 B1 | 8/2019 | Zhang et al. | |
| 10,396,630 B2 | 8/2019 | Garmon et al. | |
| 11,056,950 B2 | 7/2021 | Jung et al. | |
| 2009/0121563 A1 | 5/2009 | Zhou et al. | |
| 2014/0368064 A1 | 12/2014 | Fedoseyev et al. | |
| 2015/0042185 A1 | 2/2015 | Buttner et al. | |
| 2015/0280523 A1 | 10/2015 | Tremelling et al. | |
| 2020/0227964 A1* | 7/2020 | Ronning | H02K 1/2733 |
| 2021/0331554 A1 | 10/2021 | Mancini et al. | |

FOREIGN PATENT DOCUMENTS

| | | |
|---|---|---|
| KR | 1020120034792 A | 4/2012 |
| WO | WO 2019/032686 A1 | 2/2019 |
| WO | WO 2020/219955 A1 | 10/2020 |

* cited by examiner

ELECTRIC DRIVE UNIT WITH A HEAT EXCHANGER THAT IS FORMED BY DISKS HAVING A DISK SPRING PORTION AND WHICH ARE RECEIVED INTO A BORE IN A ROTOR SHAFT OF AN ELECTRIC MOTOR

CROSS-REFERENCE TO RELATED APPLICATIONS

This application is a continuation of U.S. application Ser. No. 17/795,497 filed Jul. 26, 2022, which is a national stage entry of International (PCT) Application No. PCT/US2022/016251 filed Feb. 14, 2022, which claims the benefit of U.S. Provisional Application No. 63/271,937 filed Oct. 26, 2021 and U.S. Provisional Application No. 63/159,511 filed Mar. 11, 2021. The disclosures of each of the above-identified applications is incorporated by reference as if fully set forth in detail herein.

FIELD

The present disclosure relates to an electric drive unit with a heat exchanger that is formed by disks having a disk spring portion and which are received into a bore in a rotor shaft of an electric motor.

BACKGROUND

This section provides background information related to the present disclosure which is not necessarily prior art.

There is increasing interest on the part of vehicle manufacturers to incorporate an electric motor into the vehicle for purposes of providing propulsive power. To minimize the cost and size of the electric motor, it is frequently necessary to cool components of the electric motor with a flow of liquid coolant, such as the rotor of the electric motor. One known method for cooling the rotor of an electric motor utilizes a heat exchanger inside a hollow shaft of the rotor. The flow of liquid coolant is input to the heat exchanger at a first end of the rotor to a first passage, which is formed along the rotational axis of the rotor. At least part of the flow of liquid coolant that exits the first passage at a second, opposite end of the rotor is returned to the first end of the rotor through a plurality of second passages that are disposed concentrically about the first passage.

While such configurations are suited for their intended purpose, we have noted that the known configuration can be relatively costly and/or difficult to manufacture. In this regard, the exterior surface of the heat exchanger must contact the interior surface of the hollow shaft throughout the entire length of the heat exchanger to maximize potential heat transfer between the hollow shaft and the heat exchanger. Consequently, the known designs have the practical effect of requiring close tolerances between the exterior surface of the heat exchanger and the interior surface of the hollow shaft. Configuration in this manner can be relatively costly and/or relatively difficult to manufacture.

SUMMARY

This section provides a general summary of the disclosure, and is not a comprehensive disclosure of its full scope or all of its features.

In one form, the present disclosure provides an electric drive unit that includes an electric motor having a rotor with a rotor shaft and a heat exchanger that is received in the rotor shaft. The heat exchanger has a plurality of heat exchanger plates. Each of the heat exchanger plates having a hub, a rim member, and disc spring portion that interconnects the hub and the rib member. Each disk spring portion defines a plurality of coolant apertures. The heat exchanger plates are press-fit to the rotor shaft such that each disc spring portion is deflected from a pre-installation state, and each rim member being engaged to an interior surface of the rotor shaft. A first coolant passage is disposed through the hubs of the plates. The coolant apertures cooperate to form a plurality of second coolant passages that are disposed concentrically about the first coolant passage. The rim members of the heat exchanger plates are spaced apart from one another along a rotational axis of the rotor.

In another form, the present disclosure provides a method for assembling an electric motor. The method includes: providing a hollow rotor shaft; providing a stack of heat exchanger plates, each of the heat exchanger plates having a hub, a rim member, and disc spring portion that interconnects the hub and the rib member, each disk spring portion defining a plurality of coolant apertures; and press-fitting the stack of heat exchanger plates into the hollow rotor shaft such that the rim member of each of the heat exchanger plates is engaged to an interior surface of the rotor shaft, wherein a first coolant passage is disposed through the hubs of the plates, and wherein the coolant apertures cooperate to form a plurality of second coolant passages that are disposed concentrically about the first coolant passage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
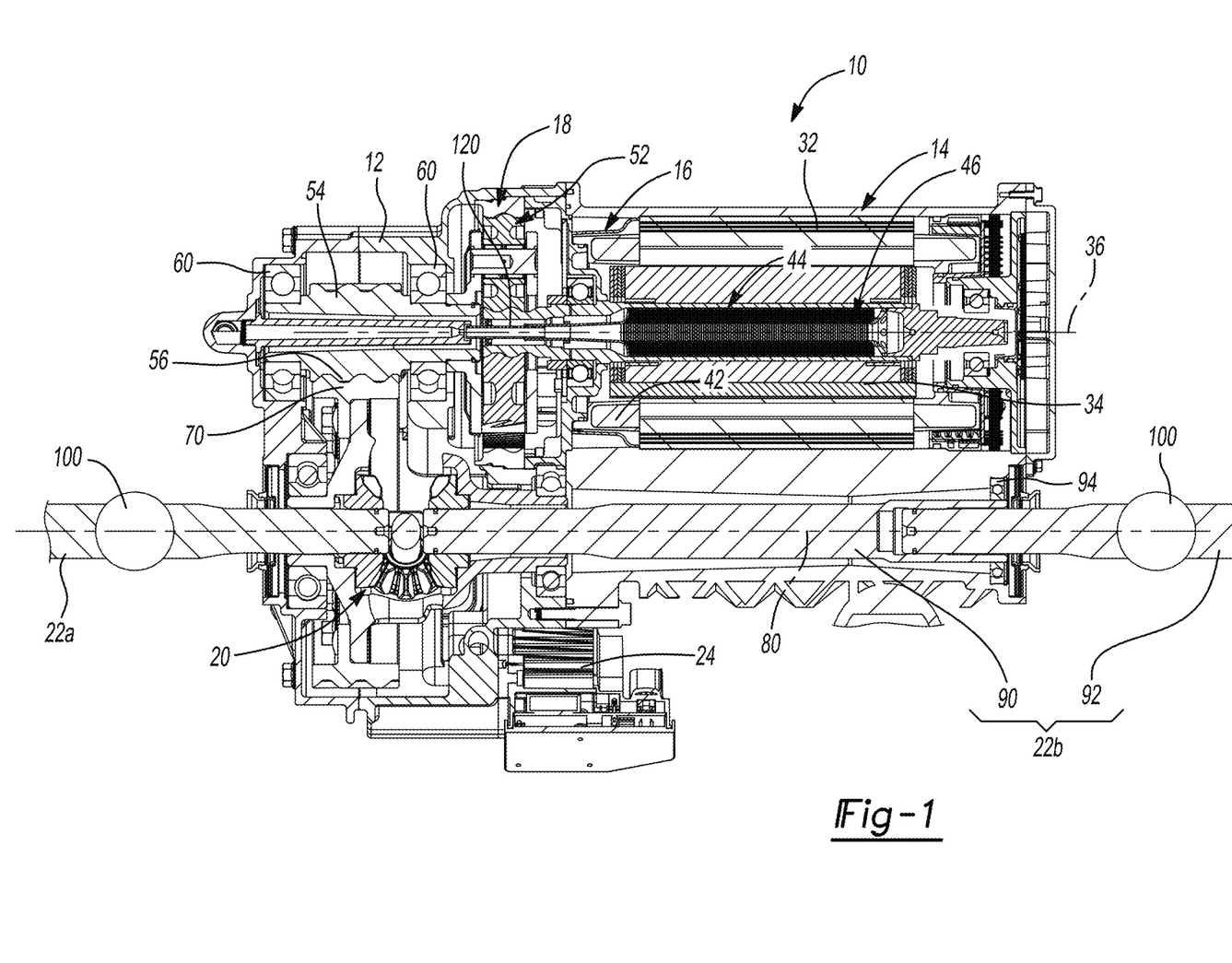
FIG. 1 is a longitudinal section view of an exemplary electric drive module constructed in accordance with the teachings of the present disclosure.

With reference to FIG. 1 of the drawings, an exemplary electric drive module constructed in accordance with the teachings of the present disclosure is generally indicated by reference numeral 10. Except as detailed herein, the electric drive module 10 can be configured in a manner that is similar to that of the electric drive module disclosed in International Patent Application Publication No. WO2020/219955. In brief, the electric drive module 10 includes a housing assembly 12, an electric motor 14, a transmission 18, a differential assembly 20, a pair of output shafts 22a and 22b and a coolant pump 24.

The housing assembly 12 can house the motor 14, the transmission and the differential assembly 20.

Figure 2:
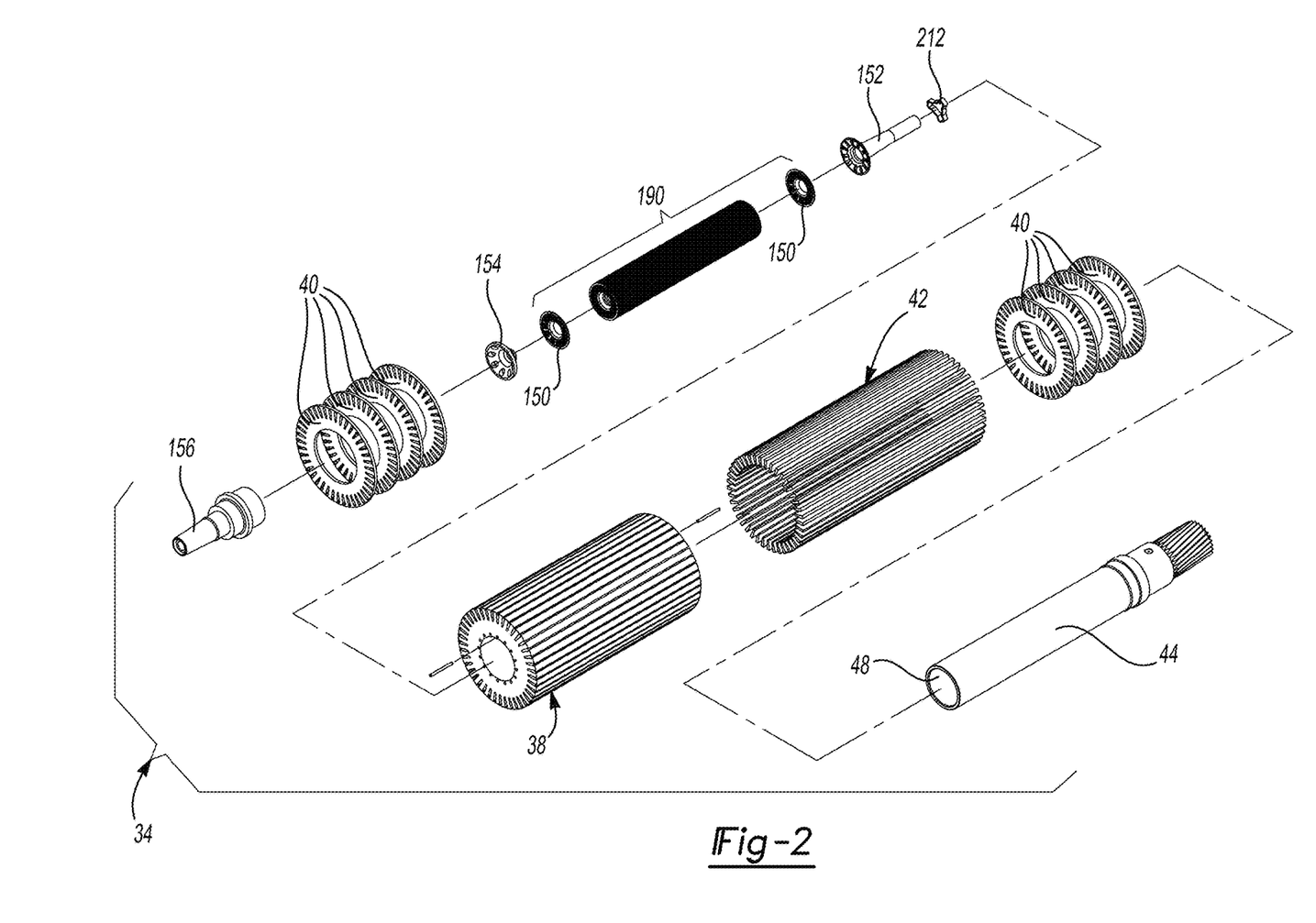
FIG. 2 is an exploded perspective view of a portion of the electric drive module of FIG. 1, illustrating a rotor of an electric motor in more detail.

With reference to FIGS. 1 and 2, the electric motor 14 can be any type of electric motor and can have a stator 32 and a rotor 34 that is received in the stator 32 for rotation about a rotational axis 36. The stator 32 can include a plurality of field windings. The rotor 34 can have a rotor body 38, which can be formed of a plurality of rotor laminations 40, a set of windings 42, which can be mounted to the rotor body 38, a rotor shaft 44 and a heat exchanger 46. The rotor shaft 44 can be a hollow and/or can define a heat exchanger bore 48 into which the heat exchanger 46 is received.

The transmission 18 can include a planetary reduction 52, a shaft 54 and a transmission output gear 56. The planetary reduction can have a sun gear, which can be unitarily and integrally formed with the rotor shaft 44 to keep pitch line velocity as low as possible, a ring gear, which can be grounded to or non-rotatably coupled to the housing assembly 12, a planet carrier and a plurality of planet gears that can be journally supported by the planet carrier and which can be meshingly engaged with both the sun gear and the ring gear. The sun gear, the ring gear and the planet gears can be helical gears. The shaft 54 can be mounted to a set of bearings 60 that support the shaft for rotation about the rotational axis 36 relative to the housing assembly 12. The transmission output gear 56 can be coupled to (e.g., unitarily and integrally formed with) the shaft 54 for rotation therewith about the rotational axis 36.

The differential assembly 20 can include a final drive or differential input gear 70 and a differential. The differential input gear 70 can be rotatable about an output axis 80 and can be meshingly engaged to the transmission output gear 56. In the example provided, the transmission output gear 56 and the differential input gear 70 are helical gears. The differential can be any type of differential mechanism that can provide rotary power to the output shafts 22a and 22b while permitting (at least in one mode of operation) speed differentiation between the output shafts 22a and 22b. In the example provided, the differential includes a differential case, which is coupled to the differential input gear 70 for rotation therewith, and a differential gearset having a plurality of differential pinions, which are coupled to the differential case and rotatable (relative to the differential case) about one or more pinion axes that are perpendicular to the second rotational axis 80, and a pair of side gears that are meshingly engaged with the differential pinions and rotatable about the second rotational axis 80. Each of the output shafts 22a and 22b can be coupled to an associated one of the side gears for rotation therewith. In the example provided, the output shaft 22b is formed as two distinct components: a stub shaft 90 and a half shaft 92. The stub shaft 90 is drivingly coupled to an associated one of the side gears and extends between an associated gear and the half shaft 92 and is supported by a bearing 94 in the housing assembly 12 for rotation about the second rotational axis 80. Each of the output shaft 22a and the half shaft 92 has a constant velocity joint 100 with a splined male stem. The splined male stem of the constant velocity joint on the output shaft 22a is received into and non-rotatably coupled to an associated one of the side gears. The splined male stem of the constant velocity joint on the half-shaft 92 is received into and non-rotatably coupled to the stub shaft 90.

The pump 24 can be mounted to the housing assembly 12 and can circulate an appropriate fluid, such as automatic transmission fluid, about the electric drive module 10 to lubricate and/or cool various components. In the example provided, fluid discharged from the pump 24 is fed through a feed pipe 120 into the heat exchanger 46 in the rotor shaft 44. The heat exchanger 46 receives the flow (inflow) of dielectric fluid along its rotational axis 36, and then turns the flow at the opposite end of the rotor 34 so that the flow of dielectric fluid flows concentrically about the inflow toward the end of the rotor 34 that received the inflow of the dielectric fluid.

Figure 3:
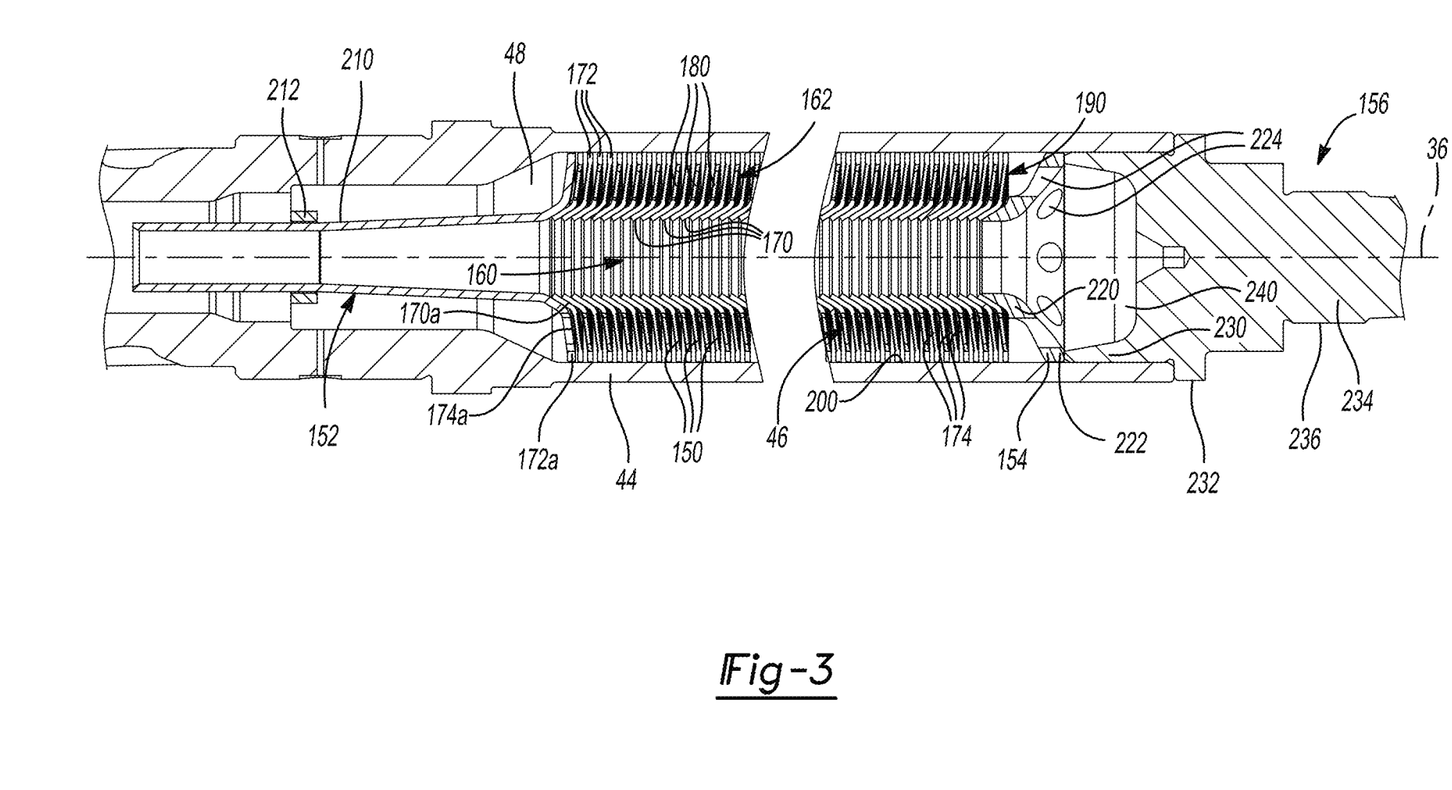
FIG. 3 is a longitudinal section view of a portion of the electric drive module of FIG. 1, the view illustrating a rotor shaft and a heat exchanger of the rotor in more detail.

With reference to FIGS. 2 and 3, the heat exchanger 46 comprises a plurality of heat exchanger plates 150 and can optionally include an input member 152, a re-direction member 154, and a plug member 156. The heat exchanger 46 defines a first coolant passage 160, which has a longitudinal axis that is coincident with the rotational axis 36 of the rotor shaft 44, and a plurality of second coolant passages 162 that are disposed concentrically about the first coolant passage 160.

Figure 4:
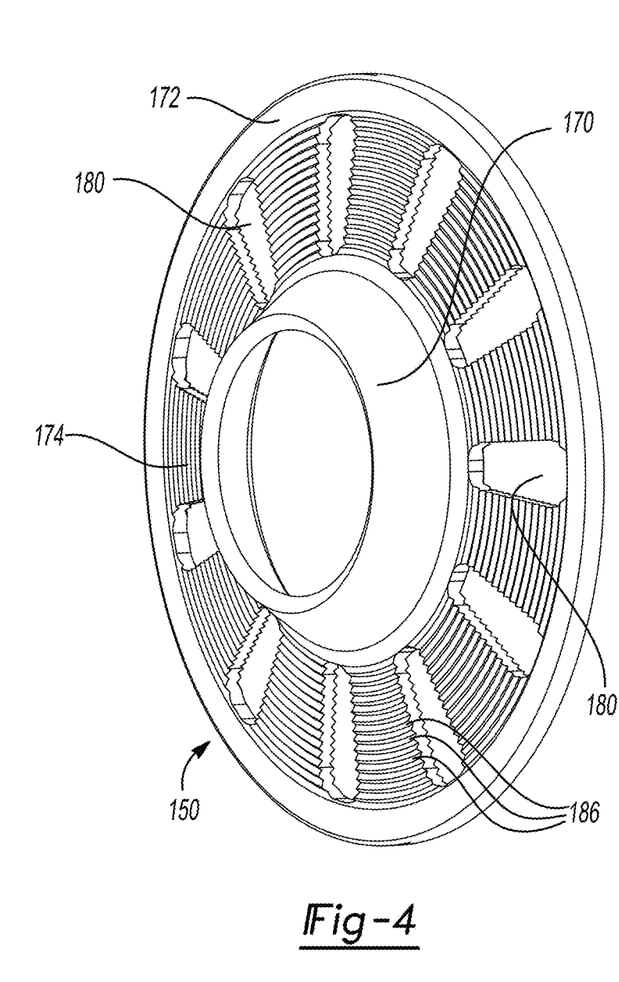
FIG. 4 is a front perspective view of a portion of the heat exchanger, illustrating a heat exchanger plate in more detail.
Figure 5:
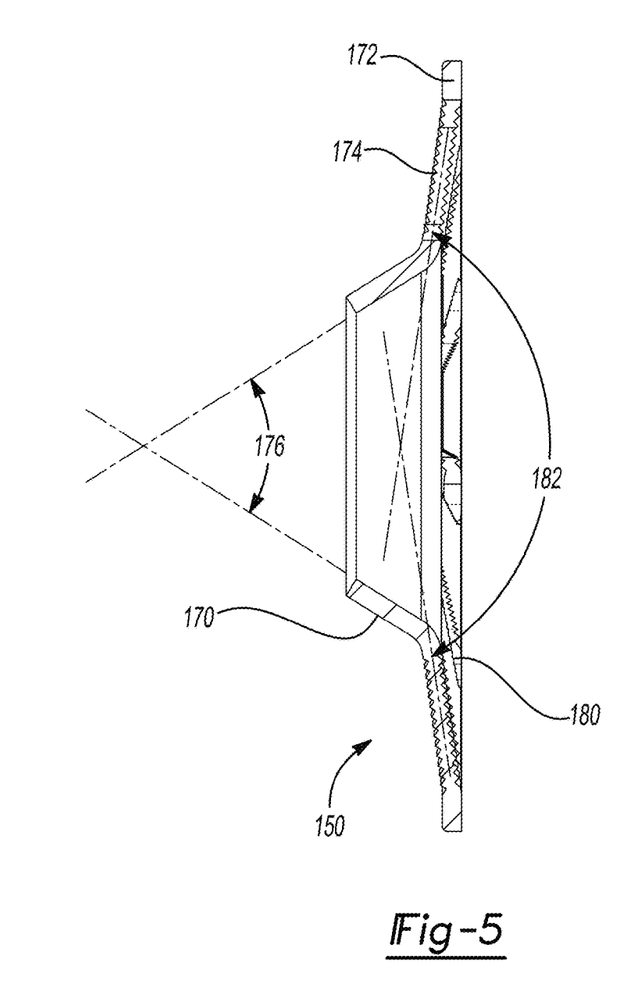
FIG. 5 is a lateral section view of the heat exchanger plate of FIG. 4.
Figure 6:
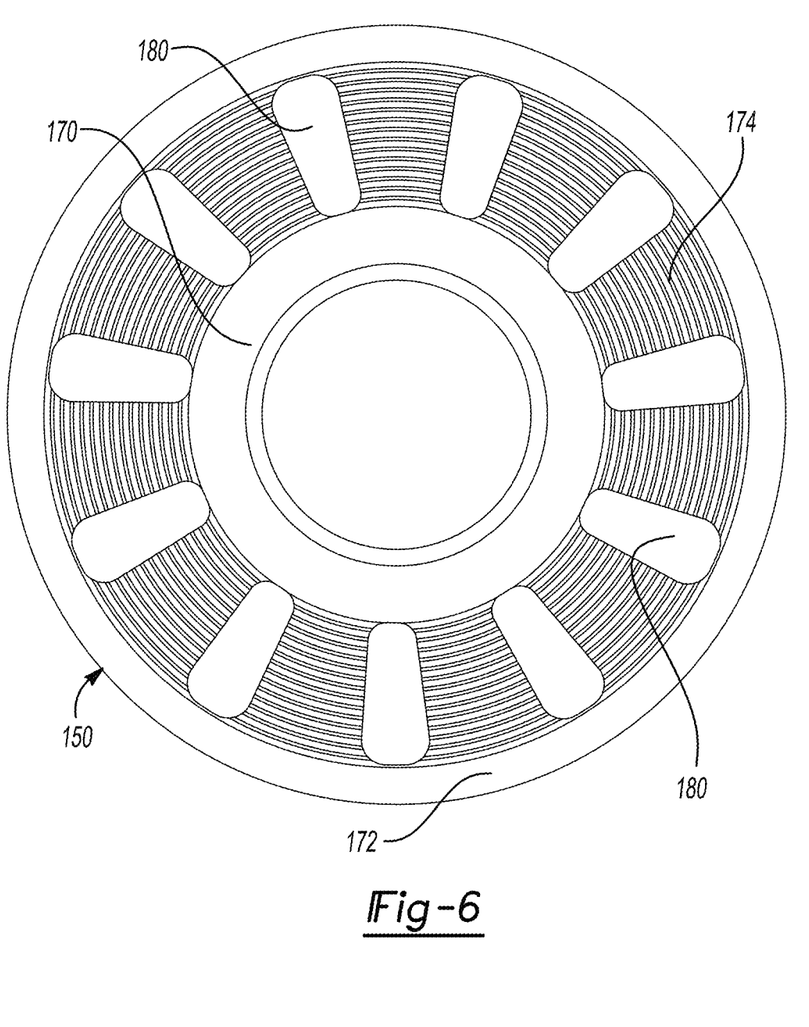
FIG. 6 is a front elevation view of the heat exchanger plate of FIG. 4.

With reference to FIGS. 4 through 6, each of the heat exchanger plates 150 can have a hub 170, a rim member 172, and disc spring portion 174. The hub 170 can be shaped in a desired manner, such as with a frusto-conical shape that can be defined by a first cone angle 176. The rim member 172 defines the outer circumference of the heat exchanger plate 150. The disc spring portion 174 interconnects the hub 170 and the rim member 172 and defines a plurality of coolant apertures 180. In the example provided, each of the coolant apertures 180 has an oval or tear drop shape, but it will be appreciated that the coolant apertures 180 could be sized, shaped and positioned in any desired manner. The disc spring portion 174 is configured in a manner that is similar to a Belleville spring washer and as such, can be contoured in a desired manner to provide a desired spring rate. In the particular example provided, the disc spring portion 174 has a frusto-conical shape that is defined by a second cone angle 182 that is larger in magnitude than the first cone angle 176. Optionally, all or a portion of one or both of the axial surfaces of the heat exchanger plate 150 can be formed to provide additional surface area. In the example provided, the disc spring portion 174 is formed with concentric ribs 186 that provide the opposite axial surfaces of the disc spring portion 174 with an undulating or wavy surface that provides approximately twelve percent more surface area than a configuration in which the disc spring portion 174 is formed with a "flat" or "smooth" (i.e., without with concentric ribs 186 that are shown).

With reference to FIGS. 3 and 4, the heat exchanger plates 150 can be stacked against one another to create a stack 190 of heat exchanger plates 150. In the example provided, the hubs 170 of the heat exchanger plates 150 abut one another, while the rim members 172 of the heat exchanger plates 150 are spaced apart from one another. Optionally, the hubs 170 can be bonded to one another, for example via a sealant and/or adhesive that is disposed between each pair of abutting hubs 170, or via a weld (e.g., resistance weld) or braze. As shown, the hubs 170 of the heat exchanger plates 150 cooperate to form the first coolant passage 160, while the coolant apertures 180 in the disc spring portions 174 form the plurality of second coolant passages 162. Notably, the coolant apertures 180 can be oriented in any desired manner. Preferably, the coolant apertures 180 of adjacent heat exchanger plates 150 are rotated out of alignment with one another so that fluid coolant passing through one heat exchanger plate 150 must rotate about the rotational axis 36 before passing through one of the coolant apertures 180 in an adjacent heat exchanger plate 150. The stack 190 of heat exchanger plates 150 is inserted (e.g., press-fit) into the rotor shaft 44 such that the rim members 172 engage an inner circumferential surface 200 of the hollow rotor shaft 44, preferably with the rim members 172 being oriented perpendicular to the rotational axis 36 of hollow rotor shaft 44 to thereby maximize conductive heat transfer between the hollow rotor shaft 44 and the heat exchanger plates 150. Due to its flexibility, the disc spring portion 174 can flex during installation of the stack 190 of heat exchanger plates 150 to ensure engagement of each of the rim members 172 to the inner circumferential surface 200 of the hollow rotor shaft 44 despite the presence of variation in the diameter of the heat exchanger bore 48 in the rotor shaft 44. Despite the flexibility of the disc spring portion 174, the rim members 172 of the heat exchanger 46 plates are spaced apart from one another along the rotational axis 36 of the rotor shaft 44 when the stack 190 of heat exchanger plates 150 is received into the rotor shaft 44. Optionally, the heat exchanger plates 150 could be formed of a material having a different coefficient of linear thermal expansion than the material from which the rotor shaft 44 is formed. For example, the heat exchanger plates 150 could be formed of aluminum, while the rotor shaft 44 can be formed of steel. Configuration in this manner permits the heat exchanger plates 150 to grow in size due to increases in temperature (e.g., from ambient air temperature to a temperature associated with continuous and stable operation of the electric drive module 10 (FIG. 1) at the ambient air temperature), which could be advantageous for the manufacture of the electric drive module 10 (FIG. 1). In this regard, tolerances on the outside diameter the heat exchanger plates 150, the inside diameter of the heat exchanger bore 48, and the cylindricity of the heat exchanger bore 48 can be increased due to the ability of individual heat exchanger plates 150 to grow into contact with the inner circumferential surface 200 of the rotor shaft 44 as the temperature of the electric drive unit 10 (FIG. 1) increases from ambient air temperature during continuous, stable operation of the electric drive unit 10 (FIG. 1). Moreover, ability of the heat exchanger plates 150 to individually grow and move in response to heating from ambient air temperature to the operational temperature of the electric drive unit 10 (FIG. 1) permits a design in which none, or only a few of, or all of the rim members 172 lightly engage the inner circumferential surface 200 of the rotor shaft 44 at a first predetermined temperature, such as −20 degrees Celsius, while the rim members 172 of all of the heat exchanger plates 150 engage the inner circumferential surface 200 of the rotor shaft 44 at a second predetermined temperature, such as 90 degree Celsius. The stack 190 of heat exchanger plates 150 could be cooled to the first predetermined temperature (while the rotor shaft 44 was maintained at room temperature) for the installation of the heat exchanger 46 to the rotor shaft 44. The second predetermined temperature could be a temperature that is below a target operating temperature at which coolant is actively circulated through the heat exchanger 46 to cool the rotor 34 (FIG. 1) during stable and continuous operation of the electric motor 14 (FIG. 1). The ability of the heat exchanger plates 150 to thermally expand at a rate that is greater than a rate at which the rotor shaft 44 expands can be employed to ensure contact between the outer circumferential surface of each of the rim members 172 of the heat exchanger plates 44 (e.g., for robust heat transfer across the interface between the rotor shaft 44 and the rim members 172) regardless of moderate variation in the diameter and/or the cylindricity of the heat exchanger bore 48 in the rotor shaft 44.

The input member 152 is configured to transport coolant fluid from the feed pipe 120 (FIG. 1) to the first coolant passage 160 and as such, can be configured in any desired manner. In the example provided, the input member 152 is configured in a manner that is similar to one of the heat exchanger plates 150 (i.e., with a hub 170a, a rim member 172a and a disc spring portion 174a). However, the input member 152 is formed from a relatively thicker material and includes a nozzle 210 that extends from the hub 170a in a direction away from the stack 190 of heat exchanger plates 150. If desired, a centering element 212 can be mounted to the nozzle 210 of the input member 152 and can engage the inner circumferential surface 200 of the rotor shaft 44. In the example provided, the centering element 212 includes a plurality of inner lobes, which engage the nozzle 210, and a plurality of outer lobes that are disposed between adjacent inner lobes and which engage the inner circumferential surface 200 of the rotor shaft 44. The relatively thicker material of the input member 152 permits the rim member 172a to engage the inner circumferential surface 200 of the rotor shaft 44 to such an extent that the input member 152 can be employed to maintain the position of the stack 190 of heat exchanger plates 150 along the rotational axis 36 at a desired location despite the fact that the disc spring portions 174 of the heat exchanger plates 150 are deflected from their pre-installation state when the heat exchanger 46 is assembled to the hollow rotor shaft 44. In the example shown, the hub 170 of one of the heat exchanger plates 150 abuts the hub 170a of the input member 152. Accordingly, it will be appreciated that that hub 170a of the input member 152 and the hub 170 of the adjacent heat exchanger plate 150 could be sealed and/or bonded to one another.

The re-direction member 154 can be an annular, frusto-conically shaped structure having an annular inner mount 220, which confronts the hub 170 of the heat exchanger plate 150 that faces the re-direction member 154, and an outer mount 222 that is press-fit into engagement with the inner circumferential surface 200 of the hollow rotor shaft 44. Alternatively, the outer mount 222 can be configured to slip-fit into the heat exchanger bore 48 in the rotor shaft 44. A plurality of re-direction apertures 224 are formed about the circumference of the re-direction member 154 between the inner and outer mounts 220 and 222.

The plug member 156 can be employed to close an open end of the hollow rotor shaft 44 into which the input member 152, the stack 190 of heat exchanger plates 150, and the re-direction member 154 are received. In the example provided, the plug member 156 includes a plug portion 230, an end stop 232, and a shaft mount 234. The plug portion 230 is sized in diameter to engage the inner circumferential surface 200 of the rotor shaft 44 in a press-fit manner as well as to sealingly engage the inner circumferential surface 200. The plug portion 230 is sized in axial length so that it positions and/or maintains the position of the re-direction member 154, and thereby the positions of the stack 190 of heat exchanger plates 150 and the input member 152, at desired locations along the axial length of the hollow rotor shaft 44. Alternatively, a resilient element (not shown), such as a wave spring, can be disposed between the plug portion 230 and the re-direction member 154. Configuration in this manner may help to maintain a desired axial load on the stack 190 of heat exchanger plates 150, which could help guard against the axial separation of the heat exchanger plates 150 from one another to inhibit leakage in the hub-to-hub interfaces between the heat exchanger plates 150. The shaft mount 234 can extend from the end stop 232 in a direction away from the plug portion 230 and can define a bearing surface 236 that is configured to receive a bearing (not shown) thereon that supports the rotor 34 (FIG. 1) for rotation relative to the housing assembly 12 (FIG. 1).

Fluid coolant exiting the first coolant passage 160 flows though the annular inner mount 220 of the re-direction member 154 and can be turned via a contoured recess 240 in an end of the plug member 156 to flow radially outward and back toward the re-direction member 154 where the flow passes through the re-direction apertures 224 and into the second coolant passages 162.

Figure 7:
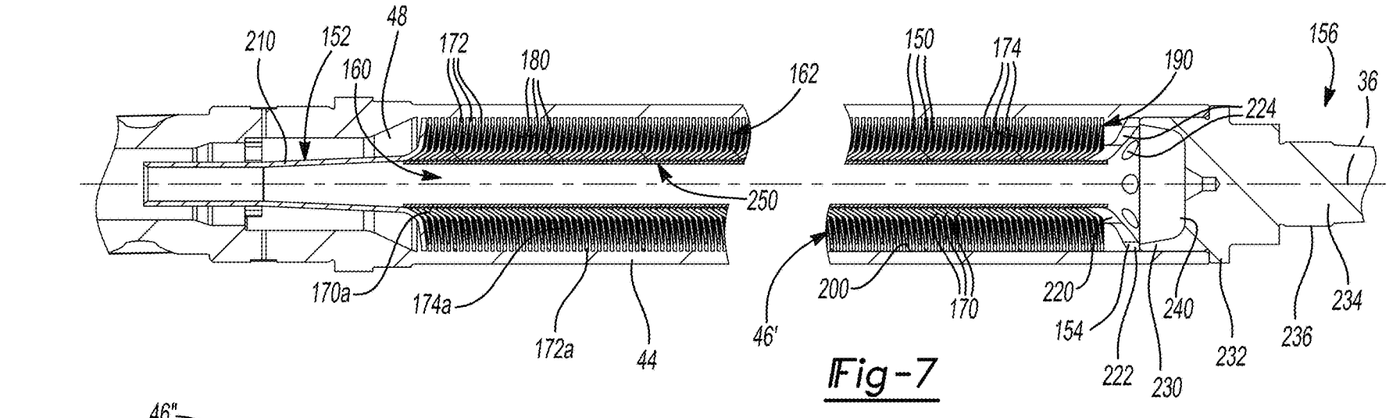
FIG. 7 is a longitudinal section view of an alternately constructed rotor and heat exchanger.

While the heat exchanger 46 has been depicted as having a stack 190 of heat exchanger plates 150 whose annular hubs 170 cooperate to form a first coolant passage 160, it will be appreciated that the heat exchanger 46 could be formed somewhat differently. With reference to FIG. 7, the heat exchanger 46' is generally similar to the heat exchanger of FIG. 3, except that a tube 250 is inserted through the hubs 170 and the tube defines the first coolant passage 160. In the example provided, the tube 250 is press-fit to the hubs 170, but it will be appreciated that the tube 250 could be welded (e.g., resistance welded) or brazed to the heat exchanger plates 150.

While the re-direction member 154 has been described as having an outer mount 222 that is press-fit into engagement with the inner circumferential surface 200 of the hollow rotor shaft 44, it will be appreciated that the outer mount 222 may be configured somewhat differently. For example, the outer mount 222 may be configured to be received into the contoured recess 240 and engaged to the plug member 156.

Figure 8:
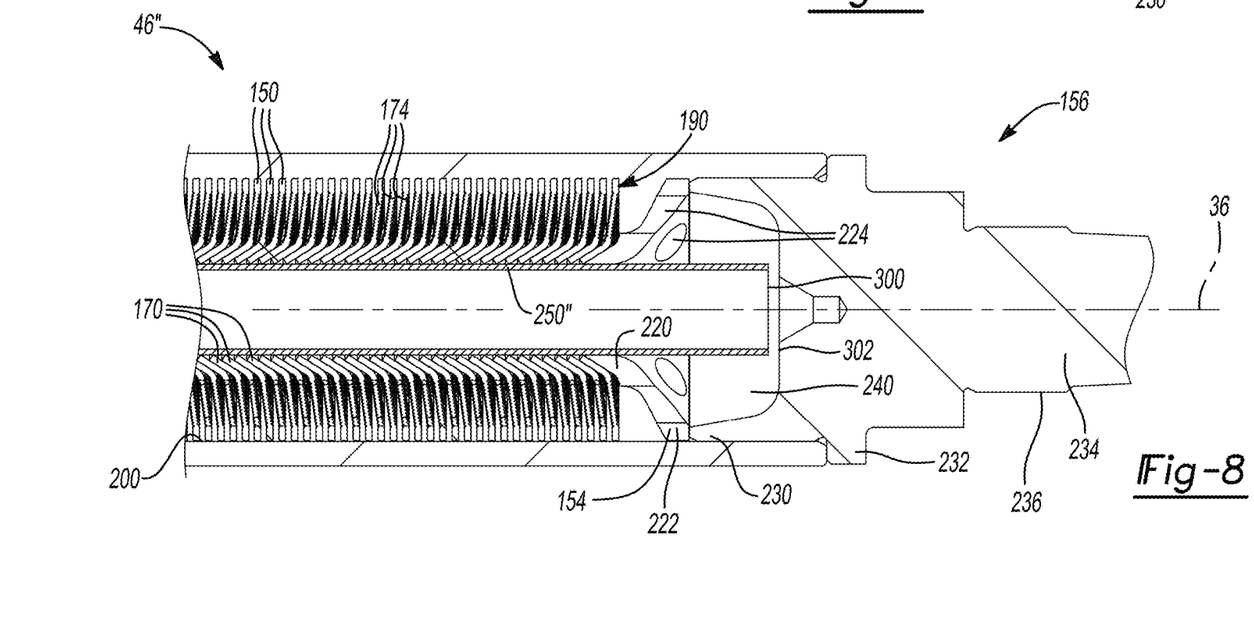
FIG. 8 is a longitudinal section view of a portion of a second alternately constructed rotor and heat exchanger.

In FIG. 8, a portion of another rotor and heat exchanger that has been constructed in accordance with the teachings of the present disclosure is illustrated. The heat exchanger 46" is generally similar to the heat exchanger 46' of FIG. 7, except that the tube 250" extends to a point that is relatively closer to the plug member 156 than the example of FIG. 7. In the particular example provided, the tube 250" extends past the point where the outer mount 222 and the plug portion 230 abut or contact one another and into the recess 240. An axial end 300 of the tube 250" can be disposed proximate an axial end face 302 on the plug portion 230 so that fluid flowing through the tube 250" impinges or strikes the axial end face 302. Configuration in this manner can improve heat transfer from the plug member 156 to the fluid that is circulated through the heat exchanger 46", especially in situations where air is entrained into the fluid that is circulated through the heat exchanger 46". In this regard, the placement of the axial end 300 of the tube 250" in the recess 240 and/or proximate the axial end face 302 on the plug portion 230, can reduce or eliminate a risk that air would collect in or proximate the plug member 156, which may potentially reduce heat transfer from the plug member 156 to the fluid that is circulated through the heat exchanger 46".

Figure 9:
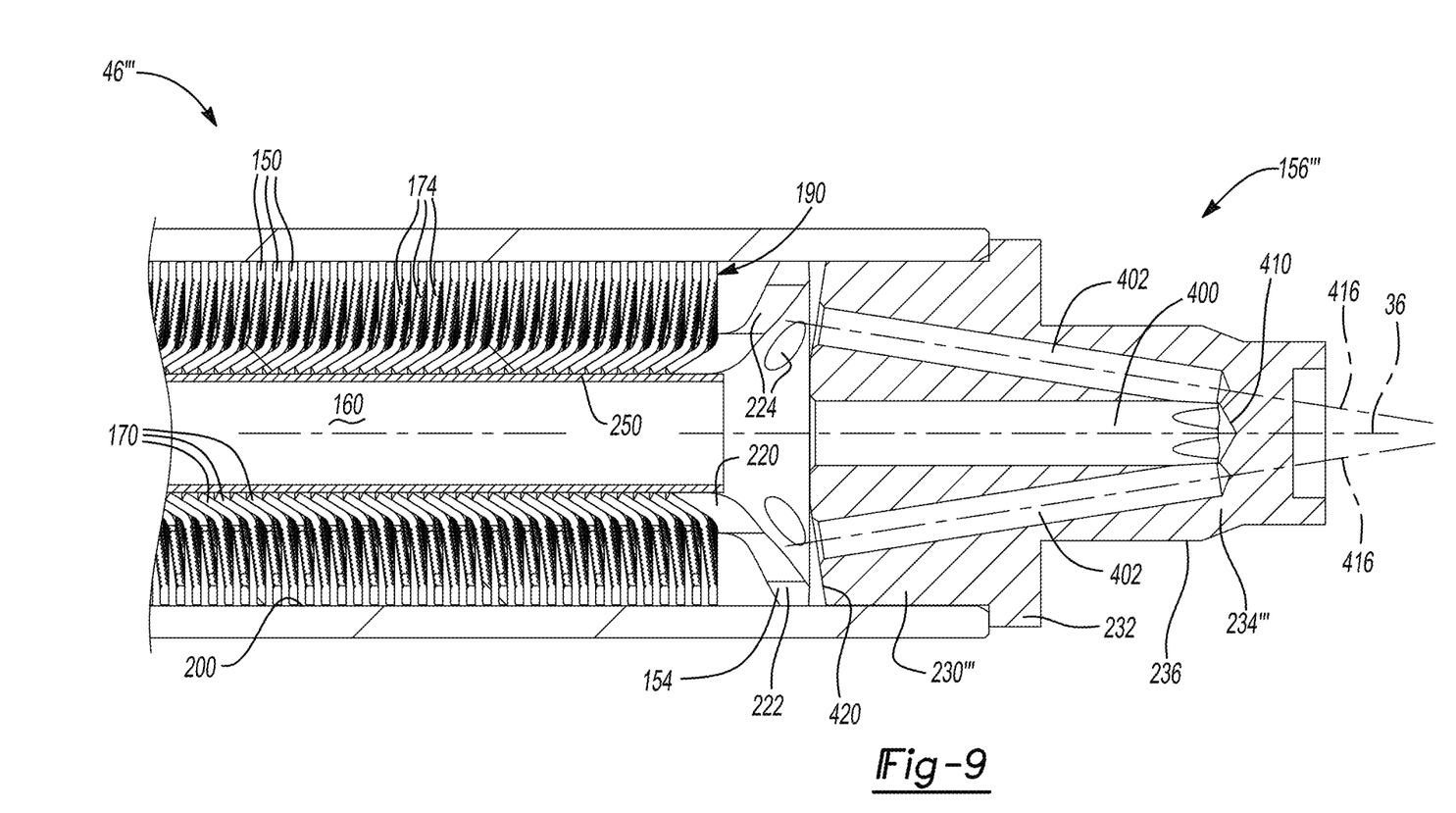
FIG. 9 is a longitudinal section view of a portion of a third alternately constructed rotor and heat exchanger.
Figure 10:
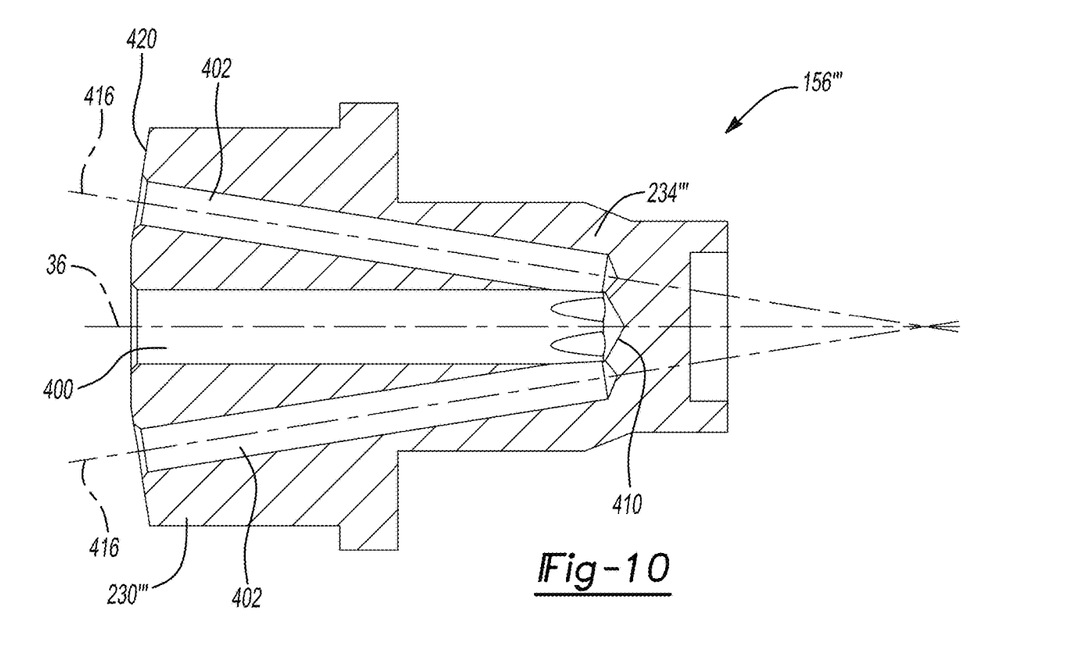
FIG. 10 is a longitudinal section view of a portion of the rotor and heat exchanger of FIG. 9, illustrating the plug member in more detail.
Figure 11:
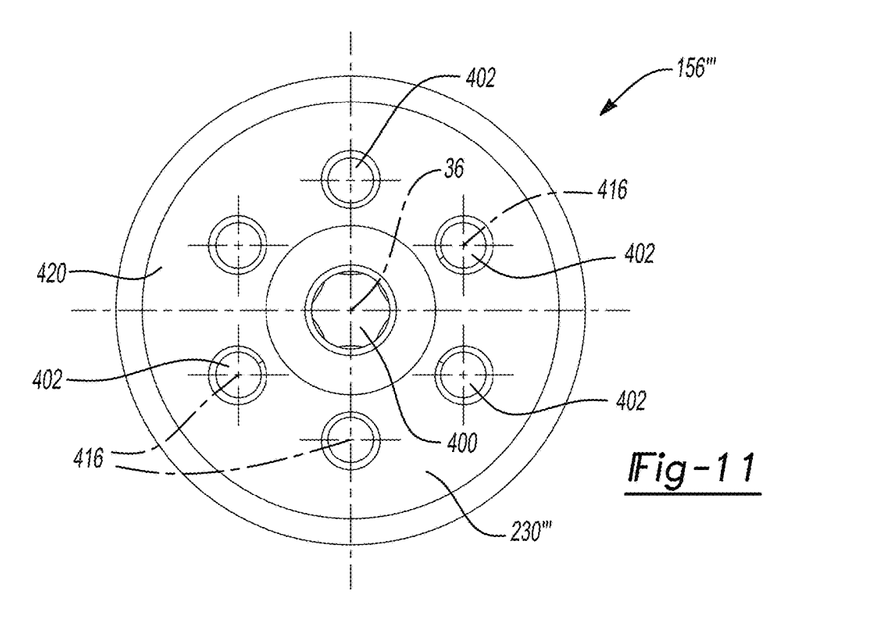
FIG. 11 is a front elevation view of the plug member of FIG. 10.

In FIG. 9, a portion of yet another rotor and heat exchanger that has been constructed in accordance with the teachings of the present disclosure is illustrated. The heat exchanger 46''' can be configured in a manner that is similar to the heat exchanger 46 of FIG. 3 or the heat exchanger 46' of FIG. 7. With additional reference to FIGS. 10 and 11, the plug member 156''' is configured with a central supply aperture 400, which is formed concentrically about the rotational axis 36 of the rotor, and a plurality of return apertures 402 that are disposed circumferentially about the central supply aperture 400. The central supply aperture 400 extends through the plug portion 230''' and the portion of the shaft mount 234" on which the bearing surface 236 is formed. Each of the return apertures 402 can be formed at an angle to the rotational axis 36 and can intersect the central supply aperture 400 proximate a distal or blind end 410 of the central supply aperture 400. In the example provided, each of the return apertures 402 has a longitudinal axis 416, and the longitudinal axes 416 of the return apertures 402 are disposed in a cone. An axial end face 420 of the plug portion 230" can be positioned relative to the re-direction member 154 of the heat exchanger 46" in a desired manner. In the example shown, the axial end face 420 of the plug portion 230''' includes a frustoconically shaped portion through which the return apertures 402 extend. The exterior surface of the frustoconically shaped portion is perpendicular to the longitudinal axes of the return apertures 402. Optionally, the exterior surface of the frustoconically shaped portion could be configured to match the frusto-conical angle of the re-direction member 154.

In operation, fluid discharged through the first coolant passage 160 can be directed into the central supply aperture 400 and thereafter into the return apertures 402 to re-direct the flow of fluid toward the re-direction apertures 224 that are formed in the re-direction member 154. Accordingly, heat from a bearing (FIG. 1) that is mounted on the bearing surface 236 and which supports the rotor for rotation about the rotational axis 36 can be conducted through the plug member 156''' (i.e., the shaft mount 234") and rejected to the cooling fluid that is circulated through the rotor and plug member 156'''. It may be desirable in some situations that the return apertures 402 intersect the central supply aperture 400 at a location that lies past or is proximate the end of the portion of the plug member 156''' on which the bearing is mounted. Centrifugal force on the fluid passing out of the central supply aperture 400 creates a kind of pumping action that forces the fluid into the return apertures 402 at the earliest opportunity. Accordingly, placement of the point at which the return apertures 402 intersect the central supply aperture 400 past the bearing (or proximate the end of the bearing that faces away from the rotor) can provide a configuration that rejects heat from the bearing in a quicker and/or more efficient manner.

Figure 9A:
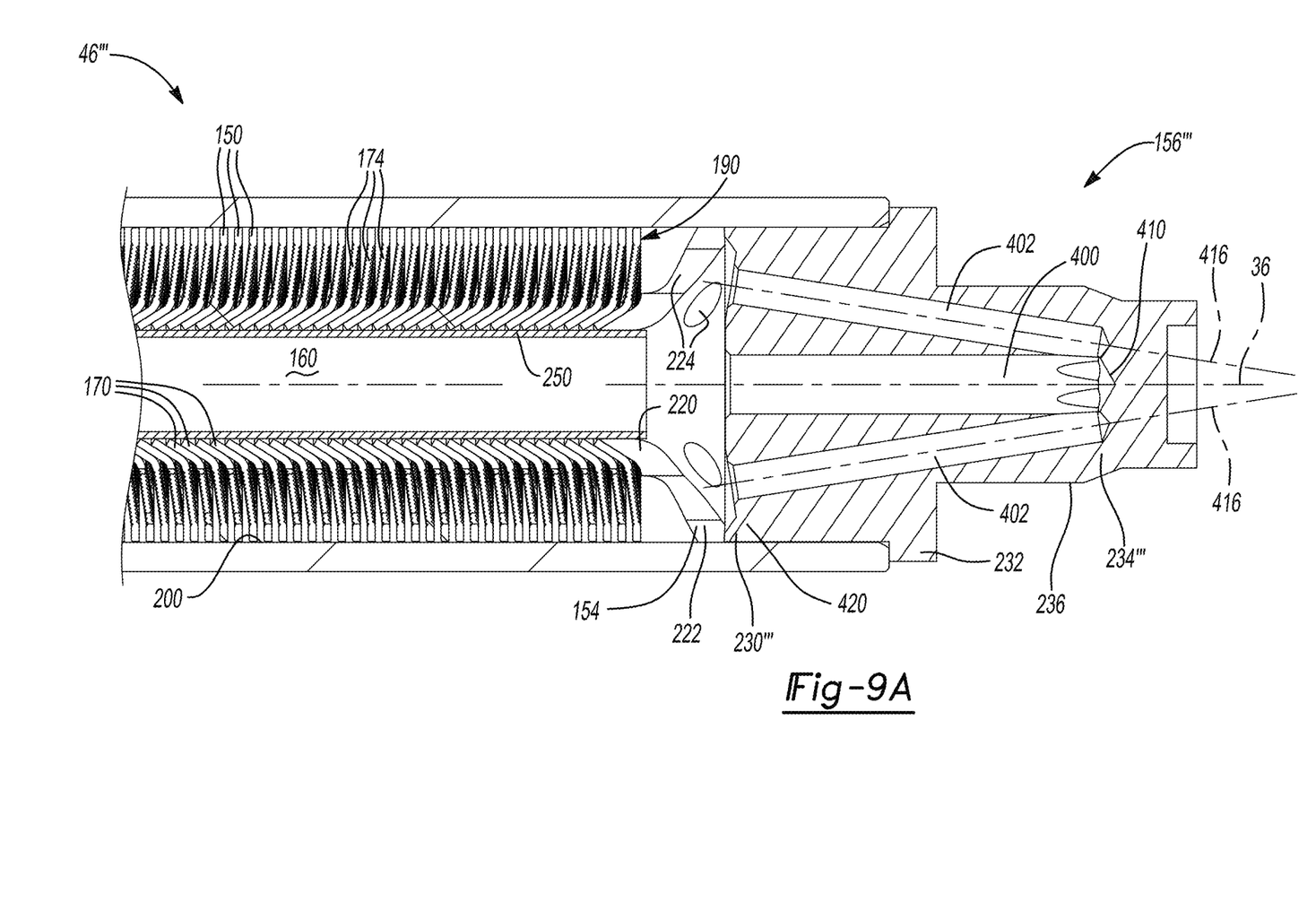
FIG. 9A is a longitudinal section view similar to that of FIG. 9 but depicting a plug member in abutment with a re-direction member.
Figures 12, 13:
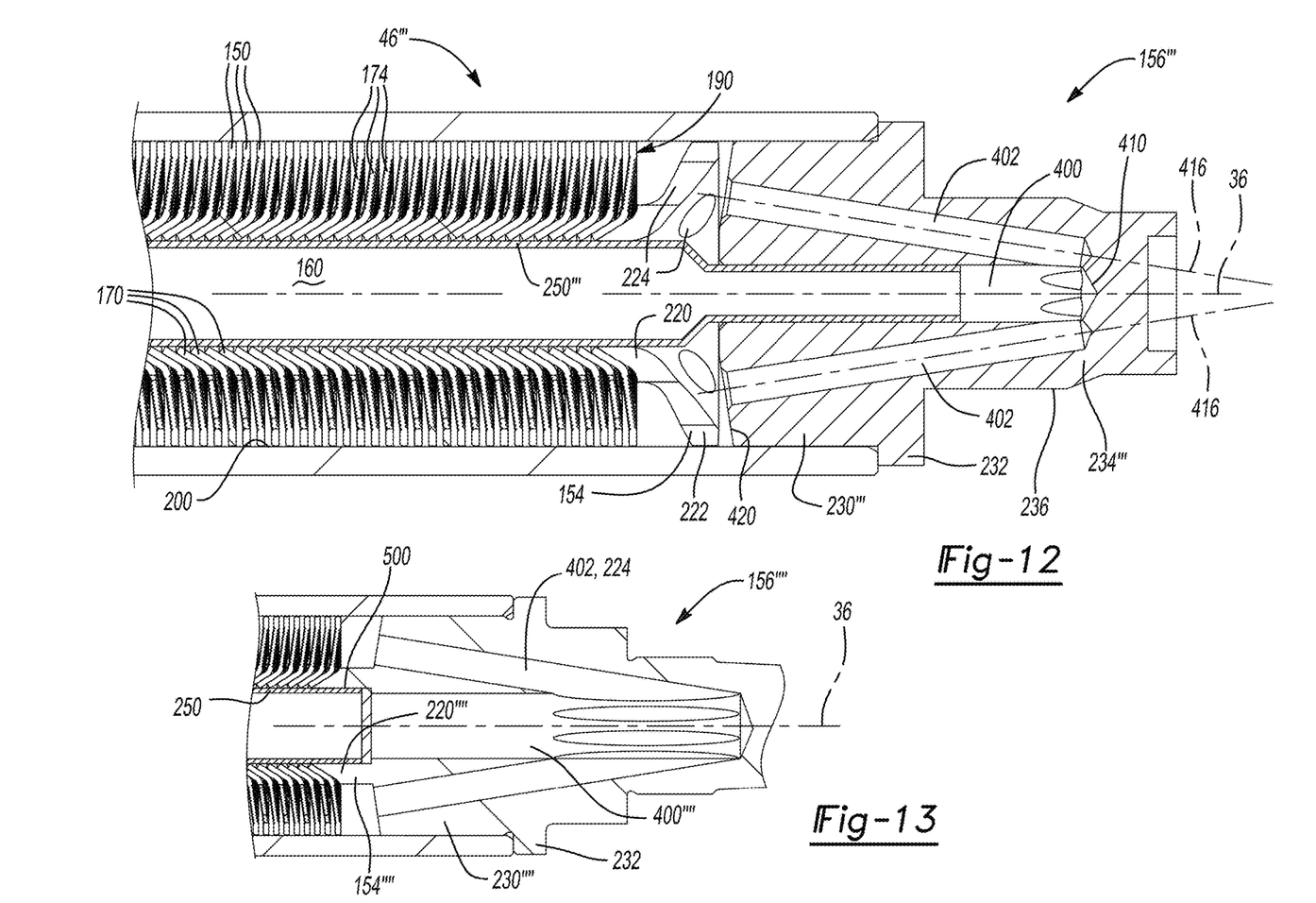
FIG. 12 is a longitudinal section view of a portion of a fourth alternately constructed rotor and heat exchanger.
FIG. 13 is a longitudinal section view of a portion of a fifth alternately constructed rotor and heat exchanger.

In situations where the first coolant passage 160 is partly or fully formed by a tube 250''', it will be appreciated that the tube 250''' could optionally be sized in its diameter and length to fit inside the central supply aperture 400 for a desired distance as is shown in FIG. 12. Configuration in this manner helps to segregate the flow of fluid into and out of the plug member 156'''. In the particular example shown, the tube 250''' is necked down in diameter after it exits or extends beyond the re-direction member 154. Additionally or alternatively, the axial end face 420 of the plug portion 230''' could be abutted directly against the outer mount 222 of the re-direction member 154 as is shown in FIG. 9A. Also optionally, the return apertures 402 could be aligned to the re-direction apertures 224 in the re-direction member 154.

While the embodiments of FIGS. 9 and 12 have been illustrated with a plug member 156''' that is integrally and unitarily formed, it will be appreciated that the plug member 156''' could be made as several discrete components that are assembled and fixedly coupled to one another. Additionally or alternatively, the re-direction member 154 could be combined with the plug member 156''. In the example of FIG. 13, the annular inner mount 220'''' of the re-direction member 154'''' can be fixedly coupled to the plug portion 230'' and the re-direction apertures 402 in the plug member 156''' could also be the re-direction apertures 224. In the example shown, the tube 250 is not necked-down but rather is received in a desired manner (e.g., slip fit, press-fit) to an enlarged or counter-bored portion 500 of the central supply aperture 400''''. It will be appreciated that the central supply aperture 400'' could be formed to a uniform diameter (i.e., so that the central supply aperture 400'''' is not stepped).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive unit comprising:
   a rotor shaft; and
   a heat exchanger received in the rotor shaft, the heat exchanger having a plurality of heat exchanger plates, each of the heat exchanger plates having a hub, a rim member, and a disc spring portion that interconnects the hub and the rim member, a plurality of coolant apertures being disposed between the rim member and the hub, the heat exchanger plates being press-fit to the rotor shaft such that each disc spring portion is deflected from a pre-installation state and each rim member having a radially outer surface that is engaged to an interior surface of the rotor shaft, wherein a first coolant passage is disposed through the hubs of the heat exchanger plates, and wherein the coolant apertures cooperate to form a second coolant passage that is disposed concentrically about the first coolant passage.

2. The electric drive unit of claim 1, wherein the radially outer surface of each of the rim members engages the interior surface of the rotor shaft in a continuous manner.

3. The electric drive unit of claim 1, wherein the hubs of the heat exchanger plates abut one another.

4. The electric drive unit of claim 3, wherein each of the hubs is frusto-conically shaped.

5. The electric drive unit of claim 3, wherein the hubs cooperate to define the first coolant passage.

6. The electric drive unit of claim 1, wherein a tube is disposed through the heat exchanger plates, the tube being thermally coupled to the hubs of the heat exchanger plates, the tube defining the first coolant passage.

7. The electric drive unit of claim 6, wherein the radially outer surface of each of the rim members extends about a full circumference of the interior surface of the rotor shaft in a continuous manner.

8. The electric drive unit of claim 6, wherein the tube is press-fit to the hubs of the heat exchanger plates.

9. The electric drive unit of claim 6, further comprising a plug member that is coupled to the rotor shaft for rotation therewith, the plug member defining a bearing surface, which is configured to receive a bearing thereon, a plug portion, which abuts the heat exchanger, wherein a recess is formed in the plug portion and wherein the tube extends into the recess in the plug portion.

10. The electric drive unit of claim 1, wherein the disc spring portion of each of the heat exchanger plates is frusto-conically shaped.

11. The electric drive unit of claim 1, wherein the rim member of each of the heat exchanger plates is oriented perpendicular to the rotational axis of the rotor shaft.

12. The electric drive unit of claim 1, further comprising:
    a stator in which the rotor shaft is received;
    a transmission having a transmission output, which is driven by the rotor shaft, and a transmission output; and
    a differential having a differential input, which is driven by the transmission output, and a pair of differential output members.

13. The electric drive unit of claim 1, wherein a plurality of concentric rings are formed on each of the heat exchanger plates over at least a portion of the disc spring portion of each of the heat exchanger plates.

14. The electric drive unit of claim 1, further comprising a plug member that is coupled to the rotor shaft for rotation therewith, the plug member defining a bearing surface, which is configured to receive a bearing thereon, a central supply aperture, which is disposed along a rotational axis of the rotor, and a plurality of return apertures that are disposed about circumferentially about the plug portion, the central supply aperture extending at least partly through a portion of the plug member on which the bearing surface is formed, each of the return apertures being in fluid communication with the central supply aperture.

15. The electric drive unit of claim 14, wherein each of the return apertures has a longitudinal axis, and wherein the longitudinal axes of the return apertures are disposed at an angle to the rotational axis of the rotor shaft so that the longitudinal axes of the return apertures are disposed in a cone.

16. The electric drive unit of claim 14, wherein a tube is disposed through the heat exchanger plates, the tube being thermally coupled to the hubs of the heat exchanger plates, the tube defining the first coolant passage, and wherein the tube extends into the central supply aperture in the plug member.

* * * * *